UNITED STATES PATENT OFFICE.

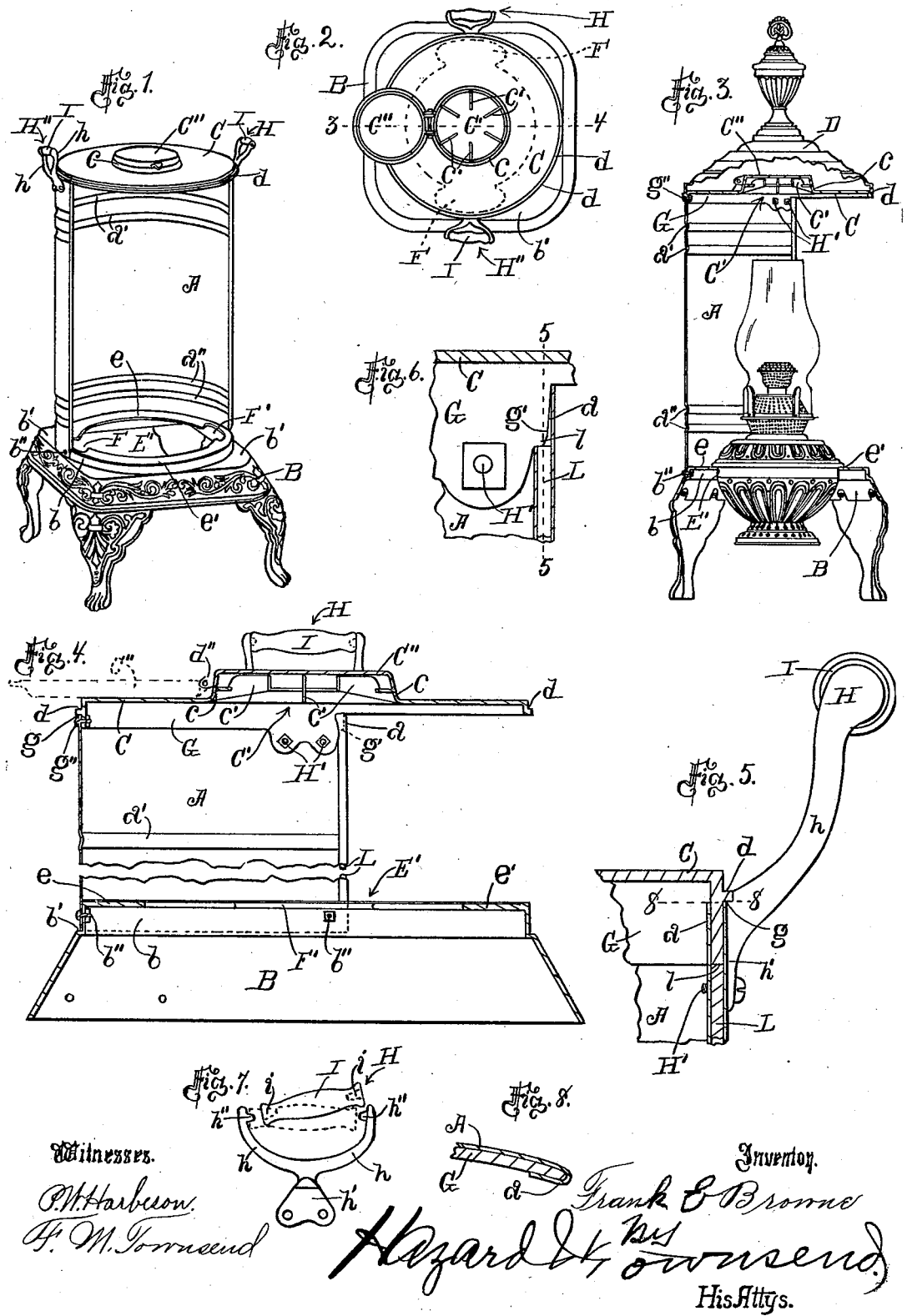

FRANK E. BROWNE, OF LOS ANGELES, CALIFORNIA.

APPLIANCE FOR HEATING, ILLUMINATING, OR CULINARY PURPOSES.

SPECIFICATION forming part of Letters Patent No. 521,201, dated June 12, 1894.

Application filed November 22, 1893. Serial No. 491,645. (No model.)

*To all whom it may concern:*

Be it known that I, FRANK E. BROWNE, a citizen of the United States, residing at Los Angeles, in the county of Los Angeles and State of California, have invented certain new and useful Improvements in Appliances for Heating, Illuminating, or Culinary Purposes, of which the following is a specification.

The object of my invention is to provide an appliance of superior utility, convenience, and artistic appearance, and which will be cheap and simple in construction.

My invention comprises means whereby I am enabled to accomplish these ends.

The accompanying drawings illustrate my invention.

Figure 1 is a perspective front elevation of my improved appliance without the lamp and the ornamental cover which have been removed therefrom to expose parts they hide when in place. Fig. 2 is a plan view of the appliance showing the lid thrown back to uncover the culinary opening to permit the use of the appliance for culinary purposes. Fig. 3 is an elevation of the appliance, largely in section, and showing the ornamental cover partially broken away to expose the culinary opening and the lid in section. The lamp is also shown in this view. Fig. 4 is an enlarged fragmental sectional view of part of the appliance; the wall being broken and the cover and the legs being omitted to contract the view. Fig. 5 is an enlarged fragmental detail of the heat deflecting top showing the means for securing the handle to the reflector or side wall of the appliance. Line 5—5 Fig. 6 indicates the line of section. Fig. 6 is a fragmental sectional detail illustrating the improved means for straining the heat reflector wall into its seat upon the heat deflecting top. Parts are broken away to expose the structure. Fig. 7 is a view of my improved handle, showing the handle bar ready to be placed in position between the arms of the bracket so that the arms may be sprung together to hold the bar firmly in its place. Fig. 9 is a section looking down on line 8—8 Fig. 5.

In the use of lamp appliances for heating and culinary purposes, it has heretofore been customary to provide a register in the heat deflecting top of the appliance upon which to set the cooking utensils. There are two serious objections to this arrangement. One arises from the fact that in an ordinary register more than one-half of the area of the opening is covered by the register when the register is open and this causes the operation of cooking upon such appliances to be slow and unsatisfactory. Another objection arises from the fact that, with the ordinary form, whenever any of the contents of a cooking utensil set on the register boils over the edge of the vessel it finds ready passage through the register and is liable to fall upon the lamp chimney, thus causing it to break.

In the drawings, A represents the heat reflector or wall which is fixed upon the base B, and C represents the heat deflecting top which is arranged upon the top of the heat reflector.

In order to secure the most effective results from the heat of the lamp when employed for culinary purposes and to prevent the liquids which may overflow from the cooking utensils from running through the culinary opening and down upon the lamp chimney, I cast or otherwise form the heat deflecting top C integral and provide near its center an elevated rim $c$ arranged surrounding the culinary opening C', and provide such rim with inwardly projecting utensil supporting lugs $c'$ projecting above the rim $c$, and a short distance inward toward the center of the opening, thus leaving the center of the culinary opening unobstructed when the lid C'' is removed therefrom, and providing against liquids running off of the top into such opening.

To give an attractive appearance to the appliance when in use as a heater, I provide a removable cover D of burnished nickel-plated spun brass and I provide a seat $d$ therefor around the rim of the heat deflecting top C.

It is liable to occur, that, through inattention upon the part of the one using the appliance, the culinary opening is not closed before the ornamental cover is placed in position upon the top of the appliance. If left thus, with the lamp lighted and the intense heat passing up through the culinary opening into the ornamental cover the cover will soon become discolored. To prevent this I provide the lid C'' and hinge it to the heat deflecting top and arrange it to cover the culinary opening and to be thrown back to uncover such opening as indicated in solid lines in Fig. 2 and in dotted lines in Fig. 4, and so arrange it that when thrown back the lid will extend across above the cover seat $d$, so that when an attempt is made to place the cover upon the top of the appliance without first closing the opening C' the lid C'' will intercept the cover and prevent it from seating and will thereby attract the attention of the user to the fact that the opening is not closed.

The raised rim $c$ forms a suitable support for hinging the lid and the lid is of such depth or thickness with relation to the height of the lugs $c'$ and is so hinged to the rim, that when thrown back to open the culinary opening, it will not project above the plane of the top of the lugs $c'$, and will not interfere with utensils placed on the rim over the opening.

In manufacturing heat reflecting walls for stoves of this class, it has heretofore been customary to form them into semi-circular shape by running a plain sheet of metal through the forming rollers. By so doing, the burnished reflecting surface is liable to be marred, by the rolls. To prevent this, it has heretofore been found desirable to place a sheet of paper upon the surface of the reflector before passing it through the rolls. I have found that by first providing the sheet of metal, of which the reflector is to be formed, with beads $a'$ $a''$ arranged one (or more) near each end of the sheet and projecting on the reflecting side of the sheet, and then, afterward, running the sheet through the forming rollers with the inner set of rollers in contact with the projecting beads in order to curve the sheet so that the beads project from the concave face of the reflector thus formed, the reflector can be given its curved form without in any way tarnishing the face thereof. These inwardly projecting beads also serve to protect the reflectors when the appliance is shipped in knockdown form. When shipping the appliances in a knockdown condition the reflectors are packed together with the beads of one reflector resting in the rear bead channel of the reflector immediately above, and that prevents the reflectors from slipping and rubbing one upon another, thus avoiding the disfigurement of the burnished surface of the reflector.

Heretofore great inconvenience has been experienced in removing the lamps from the base of appliances of this character, so that in some instances it has been deemed necessary and desirable to solder handles upon the lamp whereby to lift it from the base for filling or for other purposes. It often happens that a purchaser is already the owner of a central draft lamp, which has been used for illuminating purposes and which would give sufficient heat if placed within one of the smaller sized appliances, to comfortably warm a small room. In these lamps of smaller size, it is almost invariably the fact that the base of the lamp is of larger diameter than the bowl of the lamp. As heretofore constructed, the lamp stoves in which the lamps are suspended by the bowls, have been so arranged that it is impossible to place a lamp having its base greater in diameter than its bowl, in position in the lamp opening. I consider the means by which I overcome these difficulties to be a very important feature of my invention. The base B has the central lamp receiving opening E' at a suitable distance from the wall A and has suitable inwardly projecting flanges or other lamp supporting devices $e\ e'$ adapted and arranged to engage the bowl of the lamp and to suspend it in such opening, and is provided with suitable hand receiving openings or semi-elliptical hand holes F F' arranged upon opposite sides of, and communicating with the lamp receiving opening E' to allow the introduction of the hands on opposite sides of the lamp between the base and the bowl of the lamp to allow the operator to grasp the bowl of the lamp to thereby conveniently remove the lamp from the base. This avoids the necessity of putting handles on the lamp. I arrange these hand-holes one hole substantially opposite each edge of the semi-circular heat reflecting side wall and by arranging them in semi-elliptical shape they are thereby adapted for the convenient insertion of the fingers of the hand downward to grasp the bowl of the lamp to remove it from the base without requiring the hand holes to be made so large as to render the base unsightly. Also, when it is desired to place a lamp having a base of greater diameter than the bowl, in the appliance, it is only necessary to tip the appliance backward and to insert the base of the lamp downward diagonally through the base, the semi-elliptical openings allowing the base of the lamp to pass readily through the base of the appliance and the bowl of the lamp will engage with the lamp supporting flanges and be supported thereby. In removing the lamp, the operation is reversed. Thus, I am enabled to supply an appliance which will be suitable for use with lamps adapted for ordinary illuminating purposes when not required for use in the appliance, and also to provide means whereby the appliance may be sold separately to those already possessing lamps of this character.

In the process of manufacture it has heretofore been difficult to hold the heat receiving side wall or reflector close to its seat $g$ on the heat deflecting top while it is being secured to the top; for the reason that the sheet springs outward and is difficult to draw into its proper shape. In order to more conveniently strain the curved heat reflecting wall A into its seat upon the heat deflecting top and hold it rigidly in position while it is being secured to the top, I provide the heat deflecting top C on its under face with a downwardly projecting semi-circular flange G terminating at each end in an upwardly outwardly sloping straining face $g'$, and the semi-circular heat reflecting wall A is arranged to seat upon the outside of such curved flange, and is provided at each end with a reverse bend forming a socket *a* adapted to embrace the sloping face *g'* of the flange G which seats downward therein in a wedge manner, thus to strain the wall A and cause it to bind firmly upon the outer face of the semi-circular flange G. After the wall A has been strained upon the flange, it is secured to the flange by bolts *g''* and H. This causes the side wall to assume its proper semi-circular shape and when it is set upon the base B it readily seats itself in its proper position around the base flange *b*.

L L are stiffening wires over which the front edges of the reflecting wall are bent and the flange G is provided at each end with a shoulder *l* which rests upon and against such wire to secure greater strength and rigidity.

In manufacture, the perpendicular edges of the reflector are turned U shape to the inside as indicated in Fig. 8 to receive the wires and ends of the flange G; the reflectors are then wired, the wires being short enough to allow room at the top to permit the ends of the flange to seat in the U sockets *a* above the wires. H represents my improved handle which comprises the attaching ear *h'*, the bracket consisting of the two diverging oppositely arranged malleable arms *h* cast integral with such ear, each of such bracket arms being provided at its outer end with a short inwardly projecting bar-securing spur *h''* adapted and arranged to enter the spur receiving sockets *i* which are provided in each end of the bar I. The handle bar I is made of wood or other non heat conducting material and is of such a length as to enter between the two bracket arms, as originally cast, when one of the spurs is in its socket as indicated in dotted lines in Fig. 7; and, in manufacture, when thus assembled, the projecting arms are sprung together by a vise, or by other suitable means, and the bar is thus secured by the spurs which are thus set in their sockets. The bracket, made of malleable material, is readily bent into proper shape to hold the non heat conducting bar I. By this means I provide a cheap handle which is non heat conducting and is sufficiently strong for handling the appliance. The ears *h'* of the handles are bolted to the flange G by means of bolts H' arranged near the bottom of the ears, and such bolts also serve to secure the side wall A to the flange G. The cast iron base B is provided with a reflector supporting ledge or shoulder *b'* and with an upwardly projecting reflector securing or seating rim *b* which together form the seat for the semi-cylindrical heat reflector A and such reflector is secured thereto by the bolts *b''* passed through the rim. The lamp supporting flanges *e e'* project inward from the top of the rim *b* and the general appearance is improved by such rim which rim thus serves the double purpose of holding the lamp above the main body of the lamp and also to seat and secure the reflector.

Heretofore, appliances of this class have been inconvenient for moving from room to room in the house and from place to place in the room. I relieve this inconvenience by providing my appliance with two outwardly projecting handles H, H'' provided respectively with a non heat conducting bar I and secured to the heat deflecting top and the top of the semi-cylindrical heat reflector A at the opposite edges of the reflector and diametrically opposite each other with relation to the top and the lamp carrying base B so that the appliance can be lifted and carried by such handles with great ease and convenience without tipping the lamp.

In using these appliances it is often found desirable to move the appliance from one room to another while the lamp is burning, for the reason that the chimney of the lamp becomes very hot and requires considerable time in which to cool sufficiently to be handled. Thus, if the lamp is extinguished before moving, it is some little time before the chimney can be removed to again relight it. I have found that if the appliance is carried with the deflecting wall in front of the chimney of the lamp the chimney is thus sheltered from the draft which would otherwise cause the lamp to smoke. By arranging the handles at the opposite edges of the semicircular heat reflecting side wall it is convenient and natural for a person wishing to move the appliance to stand in front of the same and grasp the handles, thus carrying the appliance with the heat deflecting walls in position to shield the chimney from the draft and thereby avoiding to a great extent the liability of the lamp smoking.

Now, having described my invention, what I claim as new, and desire to secure by Letters Patent, is—

1. An appliance for heating, illuminating and culinary purposes, provided with a heat deflecting top having a seat arranged to seat an ornamental cover and also having a culinary opening and an upwardly projecting rim integral with the top and surrounding such culinary opening, such rim being provided with upwardly projecting utensil supporting lugs extending above such rim and projecting inwardly; a lid hinged to the top and adapted to be swung upon its hinge and to cover the upwardly projecting lugs and close the culinary opening, and to be swung on its hinge to unclose the opening and to lie flat upon the top and to extend across the ornamental cover seat.

2. In an appliance for heating, illuminating and culinary purposes, the combination of the heat deflecting top provided on its under face with a downwardly projecting semi-circular flange terminating at each end in an upwardly inclined reflector straining face; the semi-circular heat reflector wall provided at its edges respectively with reverse bends forming sockets respectively embracing the sloping ends of the flange and wedged upon such flange to strain the side wall firmly upon the outer side thereof.

3. A curved sheet metal reflector rolled from a polished sheet of metal having ridges or beads on the polished side thereof.

4. The combination of the lamp carrying base; the semi-cylindrical heat reflector fixed to such base; the heat deflecting top fixed to the top of said reflector and the two handles secured to the heat deflecting top and the top of the reflector at the opposite edges of the reflector.

F. E. BROWNE.

Witnesses:
JAMES R. TOWNSEND,
ALFRED I. TOWNSEND.